July 12, 1927.
W. HORT
1,635,787
METHOD AND APPARATUS FOR THE FATIGUE TESTING OF MATERIAL
Filed March 14, 1925
Fig. 1.
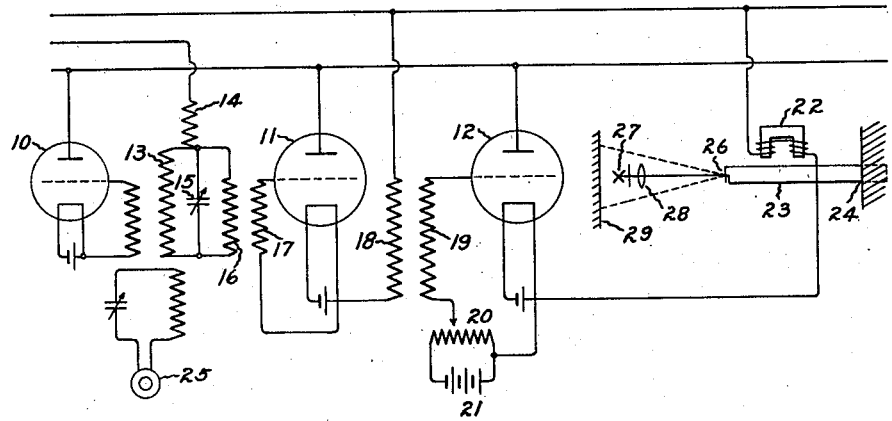
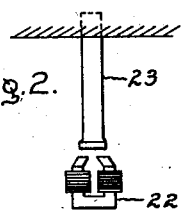
Fig. 2.
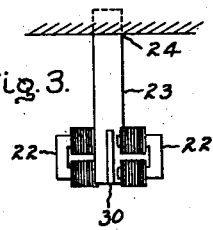
Fig. 3.
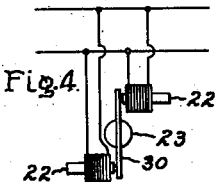
Fig. 4.
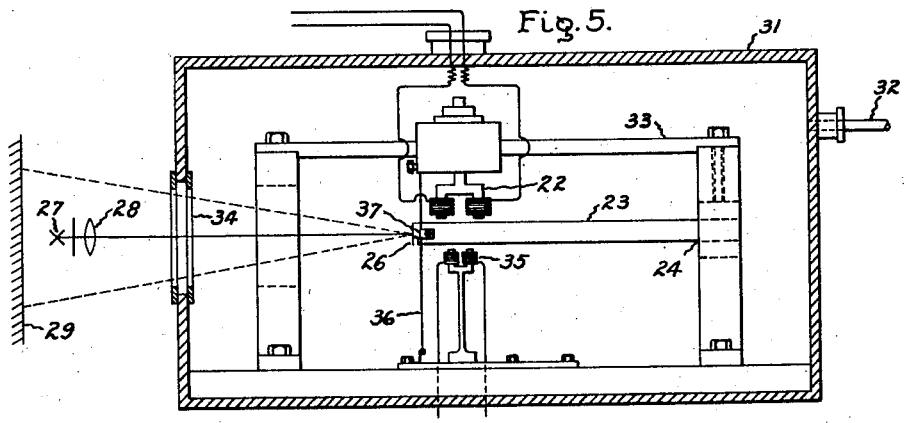
Fig. 5.
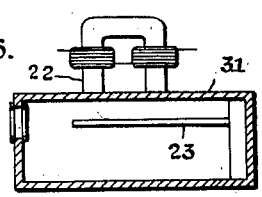
Fig. 6.
Inventor:
Wilhelm Hort,
by *Alexander F. Lunt*
His Attorney.

Patented July 12, 1927.

1,635,787

UNITED STATES PATENT OFFICE.

WILHELM HORT, OF CHARLOTTENBURG, GERMANY, ASSIGNOR TO GENERAL ELECTRIC COMPANY, A CORPORATION OF NEW YORK.

METHOD AND APPARATUS FOR THE FATIGUE TESTING OF MATERIAL.

Application filed March 14, 1925, Serial No. 15,653, and in Germany June 7, 1924.

My invention relates to a method of and apparatus for the testing of the fatigue phenomena of construction materials due to vibration.

It is known that structural steel and other material used in structures of various kinds when subjected to continuous vibration sometimes fails due to what is known as fatigue. Heretofore such materials have been tested at relatively low vibration periods, for example, up to 100 cycles per second. The reason why the tests have not been carried to higher frequencies is due in part to the difficulty of producing higher mechanical vibrations under testing conditions and also because such higher vibration tests were not considered necessary. However, since the development of high speed machines, for example, steam turbines, has led to fatigue failures due to vibrations running oftentimes above 1000 periods per second, the fatigue testing of the materials used in such construction has become a necessity. Furthermore, experience has shown that, contrary to opinions heretofore held, the failures due to fatigue are more common the higher the vibration period to which the material is subjected. It now appears that the most dangerous vibration conditions are those due to resonant vibrations produced jointly by the natural period of vibration of the part under consideration, and the vibration force to which the material is subjected. It is, therefore, desirable to make use of the resonance phenomenon in the examination of the high frequency vibration stresses of construction material as otherwise considerable difficulty would be experienced in producing the high vibration forces necessary for properly carrying out the fatigue tests in a given test sample.

In any vibration machine used for carrying out such tests as are herein contemplated it is very desirable that the vibration period of the force used in producing vibration should be maintained constant during a given test. This is because the resonance vibration and the corresponding stresses of a given sample are a maximum at one particular vibration period and are damped if the vibration period be changed. To avoid any possible change in the vibration period during a given test I prefer to use an oscillation generator of the electron tube type since this type of generator is capable of generating an extraordinary uniform alternating current for a given adjustment. Such a generator is also readily adapted for producing vibrations of widely different frequencies by the adjustment of its circuit, and is therefore suitable for testing samples having different vibration periods. The vibration force may be transferred from the electric oscillation circuit to the test sample electromagnetically.

Experiments have demonstrated that the fatigue stresses of material under vibration vary with the nature and pressure of the surrounding medium. For example, the fatigue stresses are especially pronounced and dangerous when the member under investigation is placed in a vacuum or partial vacuum due to the absence of decreased damping action of the air. In a perfect vacuum the oscillation damping forces are then caused solely by the interior friction of the material being tested. In order to separate these two causes of damping and to investigate materials under different atmospheric and other gaseous conditions, another aspect of my invention consists in placing the sample being tested in an air tight chamber where the nature and pressure of the surrounding gaseous medium may be controlled as desired.

The features of my invention which are believed to be novel and patentable will be pointed out in the claims appended hereto. For a better understanding of my invention reference is made in the following description to the accompanying drawings in which Fig. 1 represents one arrangement of an electron tube oscillation circuit for producing vibration forces.

Fig. 2 represents an electromagnet arrangement for subjecting a test sample to longitudinal vibration forces. Figs. 3 and 4 are different views of an electromagnet arrangement for subjecting a test sample to tortional vibrations, and Figs. 5 and 6 represent forms of the testing machine arranged to test a sample under different conditions of the surrounding gaseous medium.

Referring to Fig. 1, 10, 11 and 12 represent electron discharge devices arranged in cascade connection for generating and amplifying an alternating current of high frequency suitable for use with my testing apparatus. The grid circuit of the electron discharge device or tube 10 is inductively connected with an oscillation circuit 13 of known arrangement. The circuit 13 and the plate of the tube are connected to a suitable source of direct current voltage, if necessary, through a resistance or self induction 14. Arranged either in parallel or series with the condenser 15 of the oscillation circuit is the primary 16 of a transformer, the secondary 17 of which forms the grid circuit of the amplifying tube 11. The tube 11 is connected to a suitable direct current voltage, and the anode current is carried through the primary 18 of another transformer the secondary 19 of which forms the grid circuit of the second amplifying tube 12 which is likewise connected to a suitable source of direct current potential.

In order to give the tube 12 a negative leading voltage, if that is necessary, the secondary circuit of transformer 19 contains a variable impedance device 20 across which is connected a battery 21. The anode circuit of the second amplifying tube 12 contains a small electro-magnet 22 which serves to convert the alternating current of high frequency of the oscillating generating apparatus into mechanical vibrations of a corresponding frequency. 23 represents a steel or iron test rod which is suitably secured at an end 24 and the free end then serves as an armature for the electromagnet 22. By varying the length of the test rod its natural period of vibration may be changed and by varying the constants of the oscillation circuit the forced vibration period as well as its strength may be changed. A wave meter 25 may be loosely coupled with the oscillation circuit to determine the periodicity of the forced vibrations.

Finally a mirror 26 may be secured to the free end of the test rod which cooperates with a light source 27 and a lens 28 to throw a visual picture of the movements of the test rod on to a photographic or observation screen 29.

With this apparatus we may produce a variety of combinations of forced and natural vibrations on the test rod and thus reproduce resonant vibration conditions corresponding to those to which the material will be subjected in actual use.

The test piece as arranged in Fig. 1 is subjected to bending stresses adjacent the clamping point 24. In Fig. 2 the test piece 23 is arranged to be subjected to lengthwise vibratory stresses by the electromagnet 22. In Figs. 3 and 4 the test rod 23 is secured at 24 and a pair of electromagnets 22 act upon a magnetic cross bar 30 so as to produce tortional vibrations in the test rod.

In any case where the material to be tested is non-magnetic the test may be carried out by securing a magnetic armature member to the test rod, one example of which is shown in Figs. 3 and 4.

In Fig. 5 the test stand is inclosed in an air tight chamber 31 and provided with a communicating tube 32 whereby the chamber may be exhausted or the atmospheric pressure decreased or whereby the chamber may be filled with steam or other gaseous fluid at any desired pressure and thus cause the test to be carried out under the conditions expected in actual practice. Also by exhausting the chamber the damping effect of the atmosphere may be eliminated and the test rod investigated from the standpoint of internal friction alone.

The various parts of the testing apparatus previously described are indicated by their designated reference characters and are supported on a suitable test stand 33. A window 34 may be provided for the light ray reflecting system or if desired the vibration period of the test rod may be investigated by a small electromagnet 35 placed where the reluctance of its circuit will be varied by the vibrations of the test rod. The winding of this magnet is carried to a suitable recording device such as an oscillograph not shown. In some cases it may be desirable to place the vibrating magnet 22 outside the chamber and allow it to influence the test rod through the wall of the chamber as indicated in Fig. 6. In this case the wall of the chamber should be made of some non-magnetic material.

In Fig. 5 I have shown a wire 36 which may be adjusted against the test rod at 37 to vary the natural period of vibration of the test rod.

In accordance with the provisions of the patent statutes, I have described the principle of operation of my invention together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:—

1. The method of testing material for fatigue phenomena which consists in the forced vibrating of a sample of such material under rarefied atmospheric conditions.

2. The method of testing material for fatigue phenomena which consists in vibrating a sample of such material in resonance with the natural period of vibration of such sample under rarefied atmospheric conditions.

3. Apparatus for testing fatigue phenomena comprising an electromagnet for producing forced vibrations, means for holding a test specimen in such relation as to cooperate with said electromagnet, a source of supply for said electromagnet comprising a series of electron discharge devices connected in cascade for producing high frequency alternating current and means for measuring the frequency of said current.

4. Apparatus for testing fatigue phenomena of test samples comprising a support for holding a test sample, an electromagnet for vibrating such test sample, an air-tight chamber within which said parts are enclosed, a light ray reflecting system for studying the vibrations of such test sample, a source of high frequency alternating current for energizing said electromagnet, means for controlling the frequency and strength of said alternating current and means for measuring said frequency.

5. Apparatus for investigating fatigue phenomena comprising an air tight chamber, means for supporting a test sample in a vibratory condition in said chamber, means for vibrating such test sample, means for controlling the vibration period, and means for recording the vibrations of such sample.

6. Apparatus for investigating fatigue phenomena comprising an enclosed chamber wherein the nature and pressure of the gaseous medium may be changed, means for supporting a test sample in a vibratory relation in said chamber, an electromagnet for vibrating said sample, a source of variable frequency alternating current for said electromagnet, and means for recording the vibrations of said test sample.

In witness whereof, I have hereunto set my hand this 27th day of February, 1925.

WILHELM HORT.